United States Patent
Morita et al.

(10) Patent No.: US 12,195,949 B2
(45) Date of Patent: Jan. 14, 2025

(54) REMOTE OPERATION ASSISTANCE DEVICE AND REMOTE OPERATION ASSISTANCE METHOD

(71) Applicant: KOBELCO CONSTRUCTION MACHINERY CO., LTD., Hiroshima (JP)

(72) Inventors: Yuki Morita, Hiroshima (JP); Yoichiro Yamazaki, Tokyo (JP); Seiji Saiki, Tokyo (JP); Yusuke Fujiwara, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 184 days.

(21) Appl. No.: 17/921,146

(22) PCT Filed: Apr. 28, 2021

(86) PCT No.: PCT/JP2021/017092
§ 371 (c)(1),
(2) Date: Oct. 25, 2022

(87) PCT Pub. No.: WO2021/230090
PCT Pub. Date: Nov. 18, 2021

(65) Prior Publication Data
US 2023/0128501 A1   Apr. 27, 2023

(30) Foreign Application Priority Data

May 14, 2020   (JP) .................. 2020-085086

(51) Int. Cl.
*E02F 9/20*      (2006.01)
*E02F 9/26*      (2006.01)
*G05D 1/00*      (2024.01)

(52) U.S. Cl.
CPC .............. *E02F 9/205* (2013.01); *E02F 9/264* (2013.01); *G05D 1/005* (2013.01)

(58) Field of Classification Search
CPC ........... E02F 9/205; E02F 9/264; E02F 3/435; G05D 1/005; G08C 2201/51; G08C 17/02;
(Continued)

(56) References Cited

U.S. PATENT DOCUMENTS

2019/0348057 A1   11/2019  Schloss et al.

FOREIGN PATENT DOCUMENTS

| JP | H06-75622 A | 3/1994 |
|---|---|---|
| JP | H08-49261 A | 2/1996 |

(Continued)

OTHER PUBLICATIONS

Machine translation of JP-2019007139A downloaded off IP.com Jun. 17, 2024 (Year: 2024).*

(Continued)

*Primary Examiner* — Peter D Nolan
*Assistant Examiner* — Tanya C Sienko
(74) *Attorney, Agent, or Firm* — Carrier, Shende & Associates P.C.; Joseph P. Carrier; Fulchand P. Shende

(57) ABSTRACT

There is provided a device or the like capable of causing a result of an operator, remotely operating a working machine, perceiving a motion aspect of the working machine to approximate to a result of the operator perceiving a motion aspect of the working machine when the operator gets on the working machine. When there is represented a relative motion of a first component (lower traveling body 410, upper revolving body 420) and a second component (upper revolving body 420, bucket 445 (working unit)) that constitute working machine 40, based on a result of detecting an operation aspect of a remote operation device 20, control is
(Continued)

performed on individual sound output aspects of a plurality of sound output devices 2220, 2221 and 2222, each arranged at different locations in a remote operation space for the operator who operates the remote operation device 20.

9 Claims, 10 Drawing Sheets

(58) Field of Classification Search
CPC ..... H04R 5/023; H04R 2499/13; H04S 7/302; H04S 2400/11
See application file for complete search history.

(56) References Cited

FOREIGN PATENT DOCUMENTS

| | | | |
|---|---|---|---|
| JP | H08-338047 A | 12/1996 | |
| JP | 2017-071991 A | 4/2017 | |
| JP | 2018-021395 A | 2/2018 | |
| JP | 2019007139 A * | 1/2019 | ............. E02F 9/205 |

OTHER PUBLICATIONS

Machine translation of JP 2019-7139 downloaded from IP.com Jun. 17, 2024 (Year: 2024).*

* cited by examiner

REMOTE OPERATION ASSISTANCE DEVICE AND REMOTE OPERATION ASSISTANCE METHOD

TECHNICAL FIELD

The present invention relates to a technique for assisting remote operation performed by an operator of a working machine such as a hydraulic excavator.

BACKGROUND ART

A technique has been proposed in which an operator operates a working machine using a remote operation device while referring to a remote image representing a working status of the working machine (see Patent Literature 1, for example).

CITATION LIST

Patent Literature

Patent Literature 1: Japanese Patent Laid-Open No. 2018-021395

SUMMARY OF INVENTION

Technical Problem

However, when the operator causes an upper revolving body of the working machine to perform a revolving motion with respect to a lower traveling body, the feeling of the revolving motion that the operator perceives through the remote image is generally lower than when actually getting on the working machine. Therefore, the control accuracy of the position (orientation) of the upper revolving body may decrease, and the efficiency of work using the working machine may decrease at last.

Therefore, the object of the present invention to provide a device or the like capable of causing a result of an operator perceiving a motion aspect of a working machine when the operator remotely operates the working machine to approximate to a result of an operator perceiving a motion aspect of a working machine when the operator gets on the working machine.

Solution to Problem

A remote operation assistance device of the present invention comprises:
  a state detection element configured to detect a motion state of a working machine or an operation aspect of a remote operation device, the remote operation device being configured to remotely control the working machine; and
  a point sound source control element configured to control individual sound output aspects of a plurality of sound output devices to displace a virtual point sound source along a specified position path when a motion state of the working machine or an operation aspect of the remote operation device represents a relative motion of a second component with respect to a first component, the plurality of sound output devices each being arranged at different locations in a remote operation space for an operator who operates the remote operation device, the first component and the second component constituting the working machine, the specified position path being determined according to a relative motion aspect of the second component with respect to the first component, the motion state of the working machine or the operation aspect of the remote operation device being detected by the state detection element.

The remote operation device with this configuration makes it possible to determine whether a relative motion of the first component and the second component that constitute the working machine is represented based on a result of detecting the motion state of the working machine or the operation aspect of the remote operation device.

Then, when the determination result is positive, control is performed on the individual sound output aspects of a plurality of sound output devices, which are arranged at different locations in the remote operation space for the operator who operates the remote operation device. This displaces a virtual point sound source along a specified position path (time series of positions), which is determined according to the relative motion aspect of the second component with respect to the first component.

This allows a result of an operator, in the remote operation space, perceiving the motion aspect of the working machine, specifically the relative motion aspect of the first component and the second component, to approximate to a result of the operator perceiving the relative motion aspect of the first component and the second component when the operator gets on the working machine (in other words, this allows the operator to perceive a motional feeling of the working machine).

DESCRIPTION OF EMBODIMENTS (Configuration of Remote Operation Assistance System)

Figure 1:
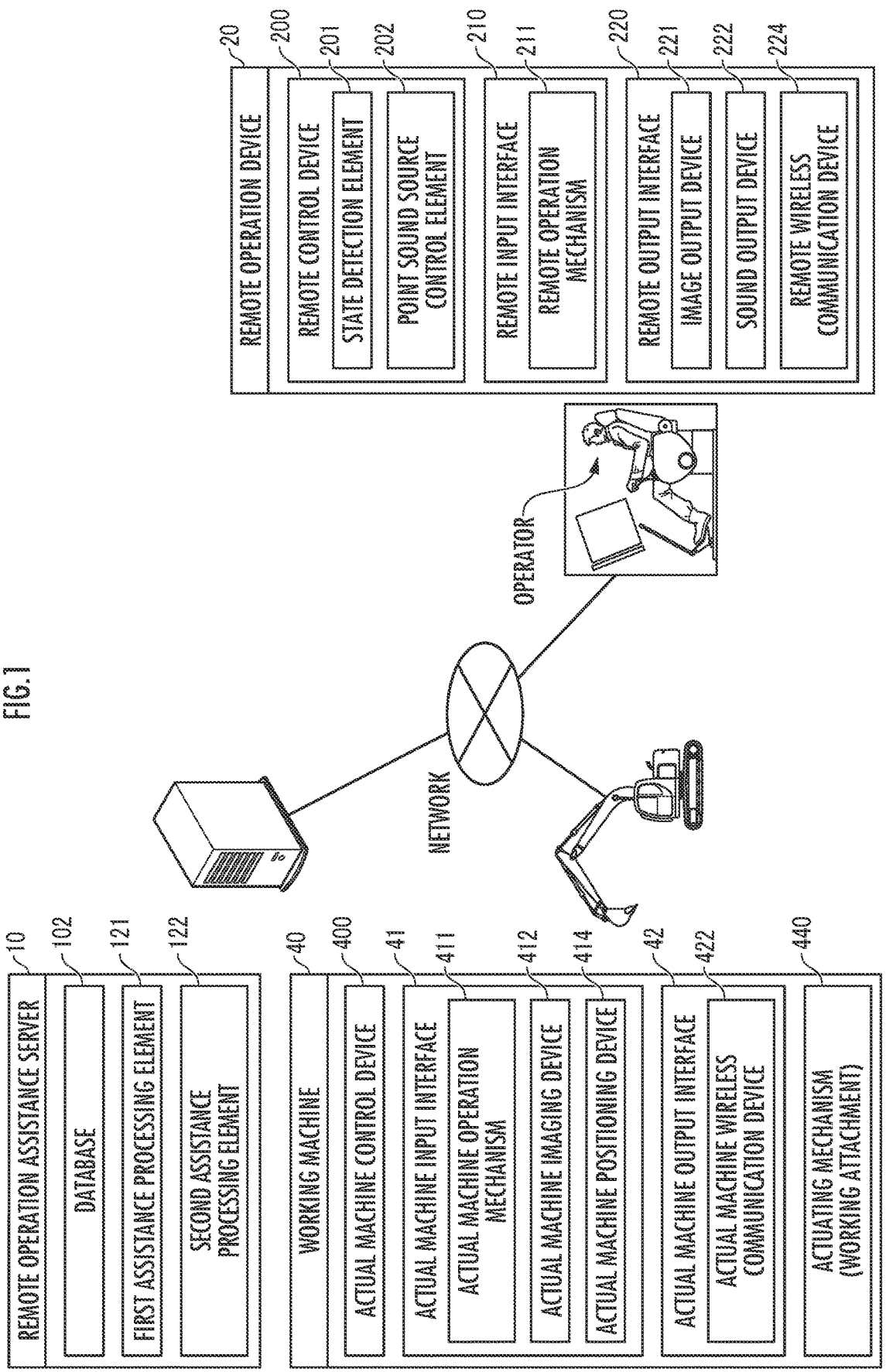
FIG. 1 is an explanatory diagram of a configuration of a remote operation assistance device according to the present invention.

A remote operation assistance system shown in FIG. 1 includes a remote operation assistance server 10 and a remote operation device 20 configured to remotely operate a working machine 40. The remote operation assistance server 10, the remote operation device 20, and working machine 40 are configured to be communicable with each other through a network. An intercommunication network between the remote operation assistance server 10 and the remote operation device 20 may be the same as or different from an intercommunication network between the remote operation assistance server 10 and the working machine 40.

The remote operation is a concept that means that an operator operates the working machine 40 from a position away from the working machine 40 without getting on the working machine 40.

The operator is a concept that means a person who operates the remote operation device 20 to operate the working machine 40.

(Configuration of Remote Operation Assistance Server)

The remote operation assistance server 10 comprises a database 102, a first assistance processing element 121, and a second assistance processing element 122. The database 102 stores and holds captured image data and the like. The database 102 may be constituted of a database server separate from the remote operation assistance server 10. Each assistance processing element includes an arithmetic processing unit (single-core processor, or multi-core processor or a processor core that constitutes this). The assistance processing element reads necessary data and software from a storage device such as a memory, and executes arithmetic processing, to be described below, on the data according to the software.

(Configuration of Remote Operation Device)

The remote operation device 20 comprises a remote control device 200, a remote input interface 210, and a remote output interface 220. In this embodiment, the remote control device 200 constitutes a "remote operation assistance device" of the present invention. The remote control device 200 comprises a state detection element 201 and a point sound source control element 202.

The remote control device 200 and components thereof include an arithmetic processing unit (single-core processor, or multi-core processor or a processor core that constitutes this). The assistance processing element reads necessary data and software from a storage device such as a memory, and executes arithmetic processing on the data according to the software.

The remote input interface 210 comprises a remote operation mechanism 211. The remote output interface 220 comprises an image output device 221, a sound output device 222, and a remote wireless communication device 224.

The remote operation mechanism 211 includes a traveling operation device, a revolving operation device, a boom operation device, an arm operation device, and a bucket operation device. Each operating device has an operation lever that receives a turning operation. An operation lever of the traveling operation device (travel lever) is operated to move the lower traveling body 410 of the working machine 40. The travel lever may also serve as a travel pedal. For example, a travel pedal may be provided that is fixed to the base or lower end of the travel lever. An operation lever of the revolving operation device (revolving lever) is operated to move a hydraulic revolving motor that constitutes the revolving mechanism 430 of the working machine 40. An operation lever of the boom operation device (boom lever) is operated to move a boom cylinder 442 of the working machine 40. An operation lever of the arm operation device (arm lever) is operated to move an arm cylinder 444 of the working machine 40. An operation lever of the bucket operation device (bucket lever) is operated to move a bucket cylinder 446 of the working machine 40.

Figure 2:
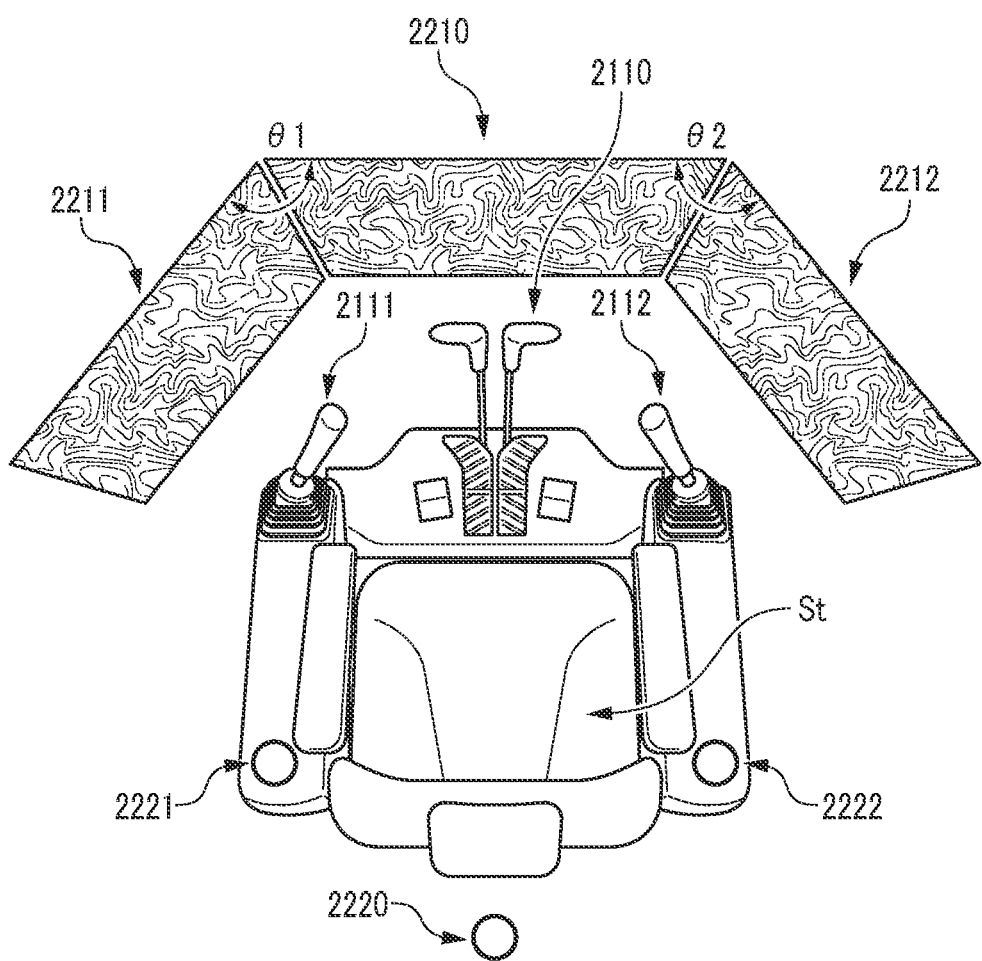
FIG. 2 is an explanatory diagram of a configuration of a remote operation device.

For example, as shown in FIG. 2, the individual operation levers that constitutes the remote operation mechanism 211 is arranged around the seat St on which the operator sits. The seat St is in a form of a high-back chair with armrests, but it may be in any form of seating on which the operator can sit, such as a form of low-back chair without a headrest, or a form of chair without a backrest.

A pair of left and right travel levers 2110 corresponding to left and right crawlers are arranged side by side in front of the seat St. One operation lever may serve as a plurality of operation levers. For example, the left operation lever 2111, which is provided in front of a left frame of the seat St shown in FIG. 2, may function as an arm lever when operated in the front-rear direction, and as a revolving lever when operated in the left-right direction. Similarly, the right operation lever 2112, which is provided in front of a right frame of the seat St shown in FIG. 2, may function as a boom lever when operated in the front-rear direction, and as a bucket lever when operated in the left-right direction. The lever pattern may be changed by an operation instruction of the operator in any way.

For example, as shown in FIG. 2, the image output device 221 includes a central image output device 2210, a left side image output device 2211 and a right side image output device 2212 each having a substantially rectangular screen, which are respectively arranged in front of the seat St, diagonally forward left thereof, and diagonally forward right thereof. The screens (image display areas) of the central image output device 2210, the left side image output device 2211 and the right side image output device 2212 may have a shape and size identical to each other, or different shapes and sizes.

As shown in FIG. 2, the screen of the central image output device 2210 and the screen of the left side image output device 2211 form an inclination angle θ1 (for example, $120° \leq θ1 \leq 150°$). As such, the right edge of the left side image output device 2211 is adjacent to the left edge of the central image output device 2210. As shown in FIG. 2, the screen of the central image output device 2210 and the screen of the right side image output device 2212 form an inclination angle θ2 (for example, $120° \leq θ2 \leq 150°$). As such, the left edge of the right side image output device 2212 is adjacent to the right edge of the central image output device 2210. The inclination angles θ1 and θ2 may be the same or may be different.

The individual screens of the central image output device 2210, the left side image output device 2211, and the right side image output device 2212 may be parallel to the vertical direction or may be inclined with respect to the vertical direction. At least one of the central image output device 2210, the left side image output device 2211, and the right side image output device 2212 may be constituted of a plurality of divided image output devices. For example, the central image output device 2210 may be constituted of a pair of vertically adjacent image output devices each having a substantially rectangular screen.

The sound output device 222 includes one or a plurality of speakers. For example, as shown in FIG. 2, the sound output device 222 includes a central sound output device 2220, a left side sound output device 2221 and a right side sound output device 2222, which are respectively arranged in the rear side of the seat St, the rear part of the left armrest, and the rear part of the right armrest. The specifications of the central sound output device 2220, the left side sound output device 2221, and the right side sound output device 2222 may be the same or may be different (Configuration of Working Machine)

The working machine 40 comprises an actual machine control device 400, an actual machine input interface 41, an actual machine output interface 42, and an actuating mechanism 440. The actual machine control device 400 includes an arithmetic processing unit (single-core processor, or multi-core processor or a processor core that constitutes this). The actual machine control device 400 reads necessary data and software from a storage device such as a memory, and executes arithmetic processing on the data according to the software.

Figure 3:
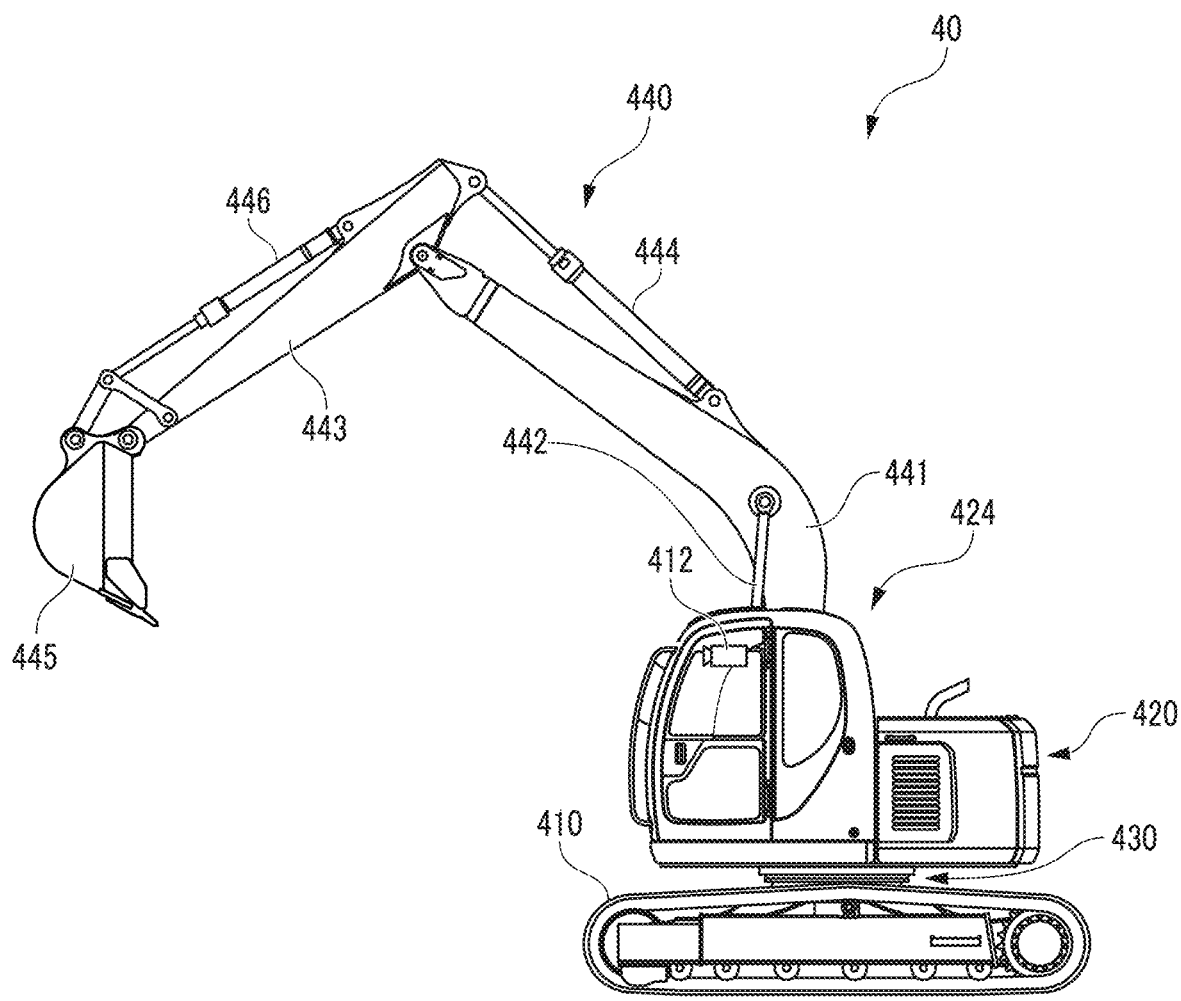
FIG. 3 is an explanatory diagram of a configuration of a working machine.

The working machine 40 is, for example, a crawler excavator (construction machine). As shown in FIG. 3, the working machine 40 comprises a crawler-type lower traveling body 410 and an upper revolving body 420 mounted on the lower traveling body 410 so as to be revolvable via a revolving mechanism 430. The front left part of the upper revolving body 420 is provided with a cab 424 (operation room). The front central part of the upper revolving body 420 is provided with a working mechanism 440.

The actual machine input interface 41 comprises an actual machine operation mechanism 411, an actual machine imaging device 412, and an actual machine positioning device 414. The actual machine operation mechanism 411 comprises a plurality of operation levers arranged around the seat arranged inside the cab 424 in the same manner as the remote operation mechanism 211. The cab 424 is provided with a drive mechanism or a robot that receives a signal corresponding to an operation aspect of the remote operation lever and moves the actual machine operation lever based on the received signal. The actual machine imaging device 412 is installed inside the cab 424, for example, and images an environment including at least part of the actuating mechanism 440 through a front window and a pair of left and right side windows. Some or all of the front window and side windows may be omitted. The actual machine positioning device 414 includes a GPS and, if necessary, a gyro sensor.

The actual machine output interface 42 comprises an actual machine wireless communication device 422.

The working mechanism 440, as the actuating mechanism, comprises a boom 441 installed onto the upper revolving body 420 so as to be able to rise and fall, an arm 443 turnably connected to the end of the boom 441, and a bucket 445 turnably connected to the end of the arm 443. The working mechanism 440 has a boom cylinder 442, an arm cylinder 444, and a bucket cylinder 446 installed thereon, each constituted of a hydraulic cylinder that can expand and contract.

The boom cylinder 442 is interposed between the boom 441 and the upper revolving body 420 so as to expand and contract when supplied with hydraulic oil to turn the boom 441 in the rising and falling direction. The arm cylinder 444 is interposed between the arm 443 and the boom 441 so as to expand and contract when supplied with hydraulic oil to turn the arm 443 around the horizontal axis with respect to the boom 441. The bucket cylinder 446 is interposed between the bucket 445 and the arm 443 so as to expand and contract when supplied with hydraulic oil to turn the bucket 445 around the horizontal axis with respect to the arm 443.

(First Function)

The following describes a first function of the remote control device 200, as the remote operation assistance device, configured as described above, using a flowchart shown in FIG. 4. In the flowchart, the block "C" is used for simplification of the description, means that data is transmitted and/or received, and means a conditional branch in which the processing in the branch direction is executed on the condition that the data is transmitted and/or received.

Figure 4:
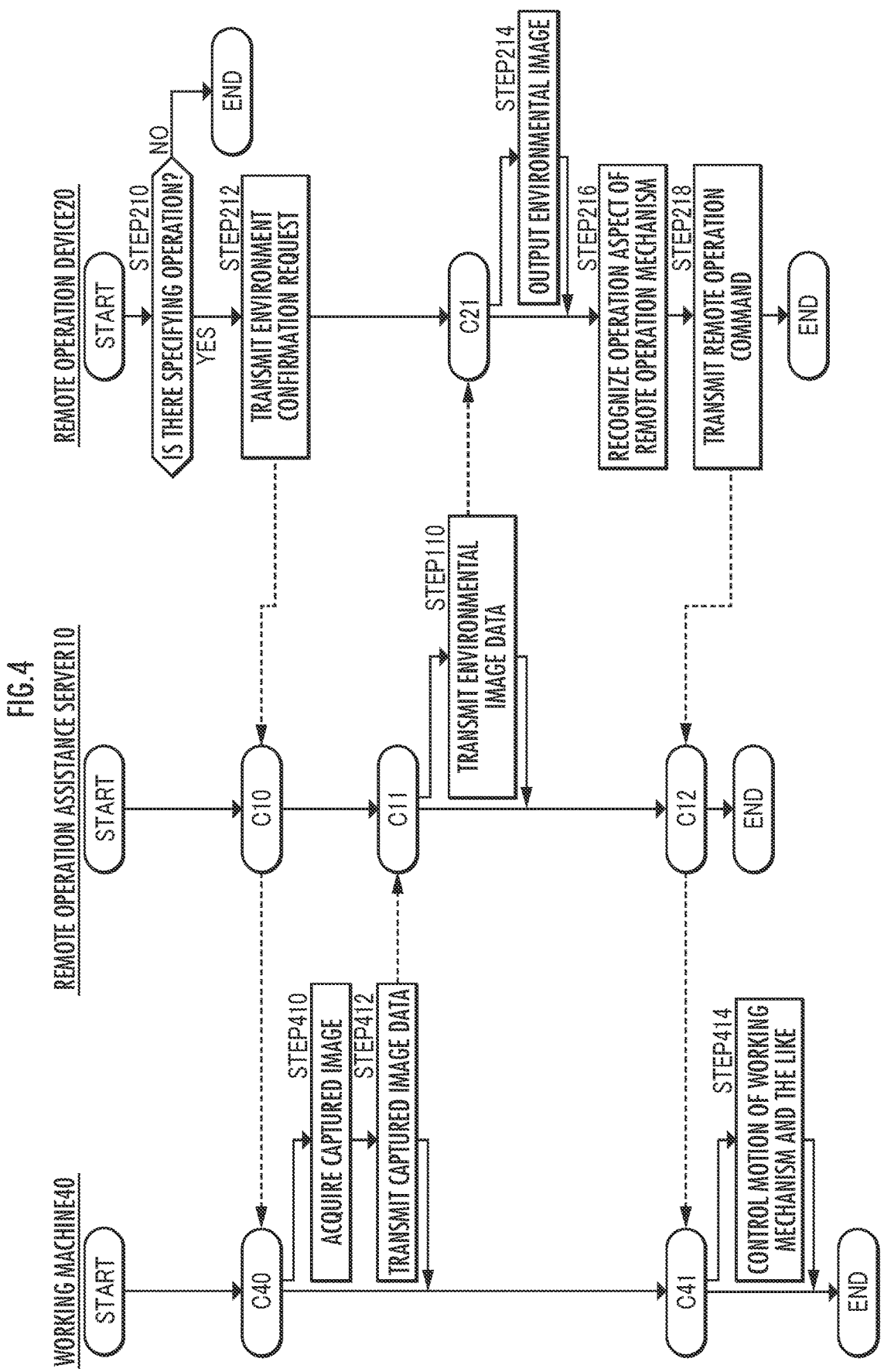
FIG. 4 is an explanatory diagram relating to a first function of the remote operation assistance device.

The remote operation device 20 determines whether the operator has performed a specifying operation via the remote input interface 210 (FIG. 4/STEP 210). The "specifying operation" is, for example, an operation such as tapping on the remote input interface 210 for specifying the working machine 40 for which the operator intends remote operation. If the determination result is negative (FIG. 4/STEP 210: NO), the series of processing ends. On the other hand, if the determination result is positive (FIG. 4/STEP 210: YES), an environment confirmation request is transmitted to the remote operation assistance server 10 via the remote wireless communication device 224 (FIG. 4/STEP 212).

If the remote operation assistance server 10 receives an environment confirmation request, the first assistance processing element 121 transmits the environment confirmation request to the relevant working machine 40 (FIG. 4/C10).

If the working machine 40 receives an environment confirmation request via the actual machine wireless communication device 422 (FIG. 4/C40), the actual machine control device 400 acquires a captured image through the actual machine imaging device 412 (FIG. 4/STEP 410). The actual device control device 400 then transmits captured image data representing the captured image to the remote operation assistance server 10 via the actual machine wireless communication device 422 (FIG. 4/STEP 412).

In the remote operation assistance server 10, when the first assistance processing element 121 receives captured image data (FIG. 4/C11), the second assistance processing element 122 transmits environmental image data corresponding to the captured image to the remote operation device 20 (FIG. 4/STEP 110). The environmental image data are the captured image data itself and additionally image data representing a simulated environmental image generated based on the captured image.

When the remote operation device 20 receives environmental image data via the remote wireless communication device 224 (FIG. 4/C21), the remote control device 200 outputs an environmental image corresponding to the environmental image data to the image output device 221. (FIG. 4/STEP 214).

Figure 6:
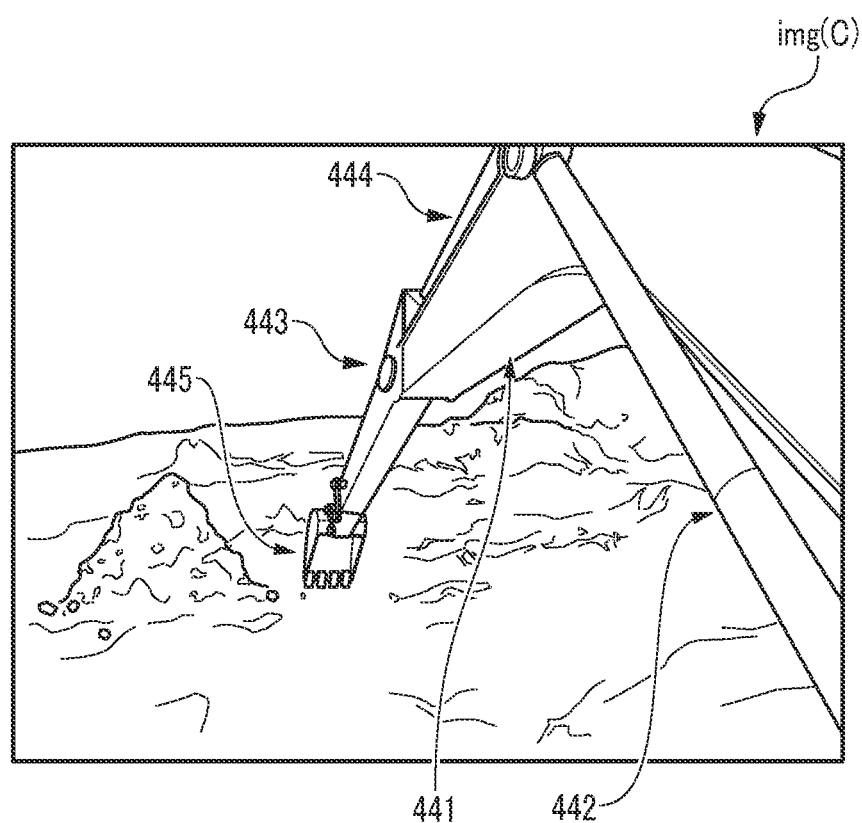
FIG. 6 is an explanatory diagram of a display aspect of an environmental image.

As a result, for example, as shown in FIG. 6, an environmental image in which the boom 441, arm 443 and bucket 445, which are part of the working mechanism 440, are reflected is output to the image output device 221.

In the remote operation device 20, the remote control device 200 recognizes the operation aspect of the remote operation mechanism 211 (FIG. 4/STEP 216), and transmits a remote operation command corresponding to the operation aspect to the remote operation assistance server 10 via the remote wireless communication device 224 (FIG. 4/STEP 218).

In the remote operation assistance server 10, if the second assistance processing element 122 receives the remote operation command, the first assistance processing element 121 transmits the remote operation command to the working machine 40 (FIG. 4/C12).

In the working machine 40, if the actual machine control device 400 receives an operation command via the actual machine wireless communication device 422 (FIG. 4/C41), control is performed on the motion of the working mechanism 440 and the like (FIG. 4/STEP 414). For example, an operation is executed in which soil in front of the working machine 40 is scooped with the bucket 445, the upper revolving body 420 is revolved, and the soil is dropped from the bucket 445.

The following describes the second function of the remote control device 200, as the remote operation assistance device, configured as described above, using the flowchart shown in FIG. 5.

Figure 5:
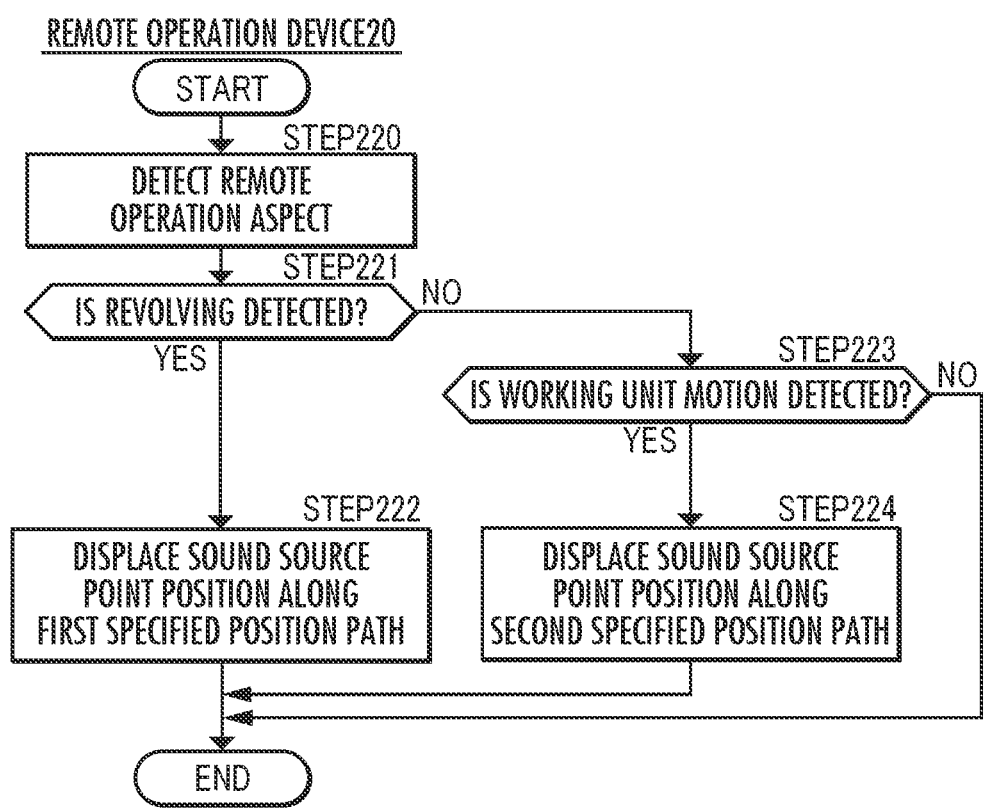
FIG. 5 is an explanatory diagram relating to a second function of the remote operation assistance device.

In the remote control device 200, the state detection element 201 recognizes the operation aspect of the remote operation mechanism 211 (FIG. 5/STEP 220). This is the same processing as FIG. 4/STEP 216. Alternatively, the state detection element 201 may recognize or detect the motion state of working machine 40 based on communication with working machine 40.

Figure 7A:
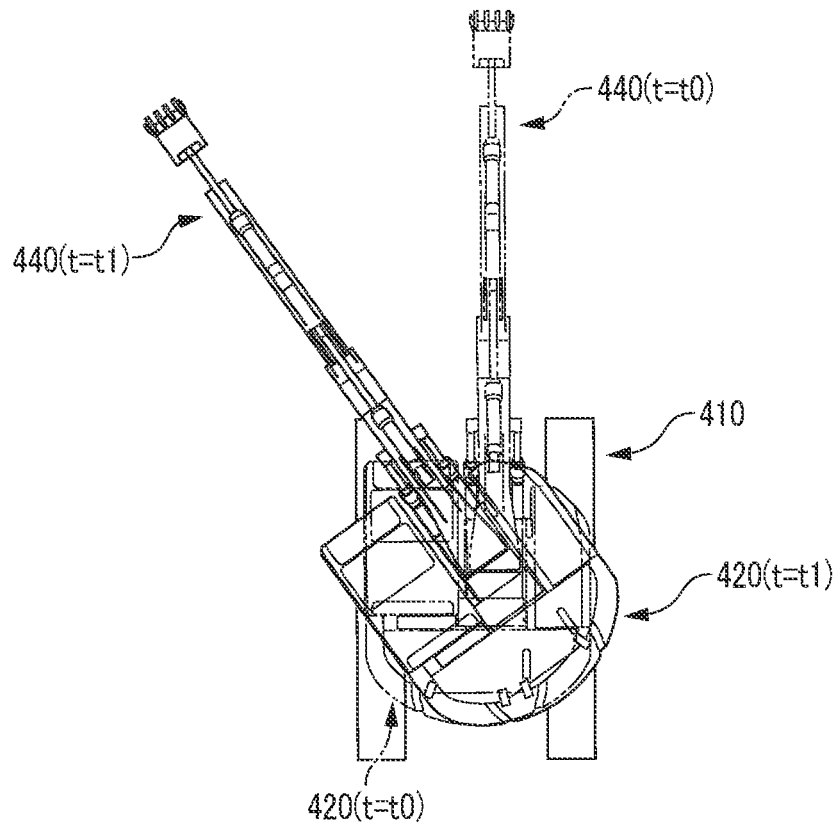
FIG. 7A is an explanatory diagram relating to a first motion of the working machine.
Figure 7B:
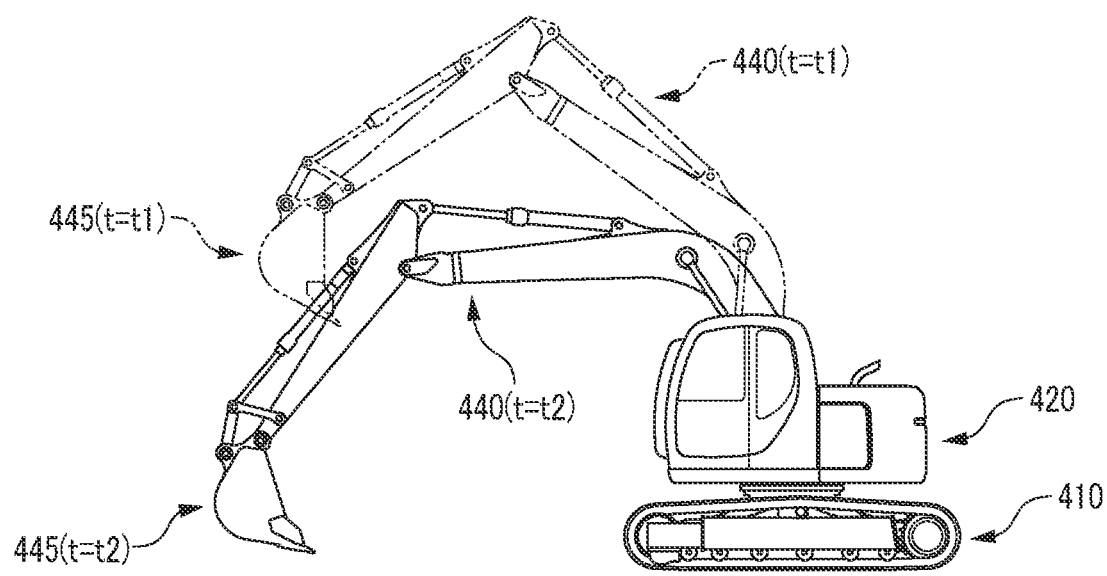
FIG. 7B is an explanatory diagram relating to a second motion of the working machine.

The state detection element 201 determines whether the operation aspect is the operation aspect of revolving lever for revolving the upper revolving body 420 (second component) with respect to the lower traveling body 410 (first component) (FIG. 5/STEP 221). If the operation aspect is determined to be an operation aspect for revolving the upper revolving body 420 with respect to the lower traveling body 410 as shown in FIG. 7A (FIG. 5/STEP 221: YES), the point sound source control element 202 controls the sound output aspects of the sound output devices 222 so that the position of a virtual point sound source is displaced along a first specified position path (FIG. 5/STEP 222).

Figure 8:
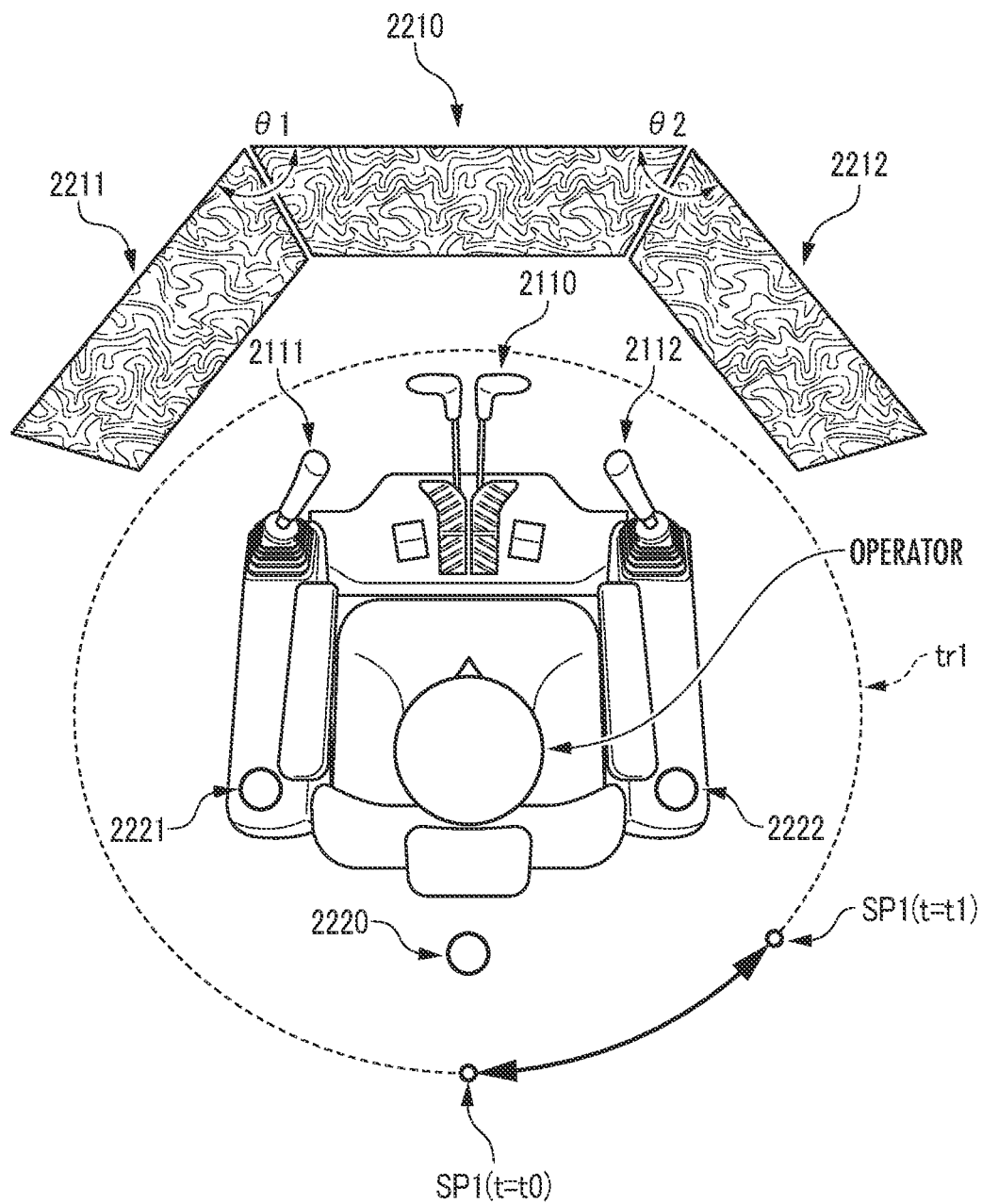
FIG. 8 is an explanatory diagram relating to a position control aspect of a virtual point sound source according to the first motion of the working machine.

As a result, for example, as shown in FIG. 8, a virtual point sound source SP1 is displaced along a first specified position path tr1 extending in a ring (for example, an annular or elliptical ring) surrounding a remote operation area (seat St) of the operator. The first specified position path tr1 may extend along a plane (cross section) parallel to the floor surface of the cab 424 or an inclined plane, or may extend along a curved surface such as a spherical surface, an ellipsoidal surface, or a wave surface. The height position of the plane or curved surface may be adjusted to fit within a range of normal operator ear height positions.

For example, when a revolving angular velocity (relative motion speed) of the upper revolving body 420 with respect to the lower traveling body 410 is zero, the position of the reference point of the virtual point sound source SP1 is adjusted so that it is positioned on the rear side of or directly behind the remote control area. The displacement direction of the virtual point sound source SP1 is controlled to be the same as the revolving direction of the upper revolving body 420 with respect to the lower traveling body 410. In addition, the displacement angular velocity of the virtual point sound source SP1 is controlled to be the same as the revolving angular velocity of the upper revolving body 420. This allows when the operation aspect of the remote operation mechanism 211 is an operation aspect in which the upper revolving body 420 is revolved counterclockwise with respect to the lower traveling body 410 (viewed from above), by an angle θ at an angular velocity ω(t) from time t=t0 to time t=t1, the virtual point sound source SP1 is displaced so as to revolve counterclockwise along the first specified position path tr1 by an angle θ at an angular velocity ω(t) from time t=t0 to time t=t1.

Figure 9:
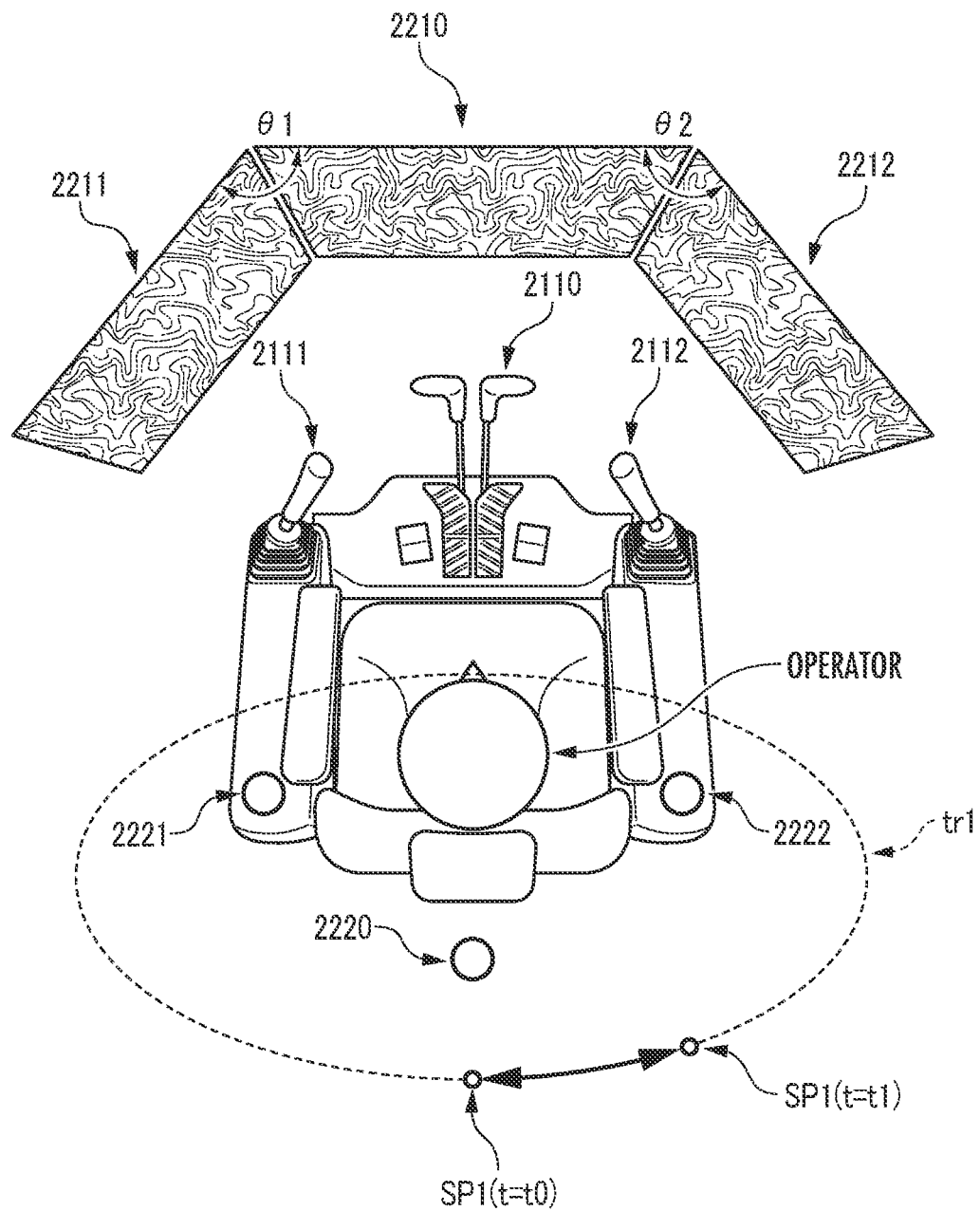
FIG. 9 is an explanatory diagram relating to a position control aspect of a virtual point sound source according to the first motion of the working machine.

As shown in FIG. 9, the first specified position path tr1 may extend so as to be biased to the rear side of the remote operation space of the operator. In this case, the virtual point sound source SP1 can be displaced along the specified position path, which is more biased to the rear side of the remote operation space than on the front side thereof. This allows the operator to perceive a motional feeling of the working machine 40 without losing his/her attention to the front.

On the other hand, if it is determined that the operation aspect is not an operation aspect for revolving the upper revolving body 420 with respect to the lower traveling body 410 (FIG. 5/STEP 221: NO), the state detection element 201 determines whether the operation aspect is an operation aspect of an arm lever or the like for displacing the bucket 445 (second component) as a working unit with respect to the upper revolving body 420 (first component) (FIG. 5/STEP 223). If the operation aspect is determined to be the operation aspect of the arm lever or the like for displacing the bucket 445 (second component) as a working unit with respect to the upper revolving body 420 (first component) (FIG. 5/STEP 223: YES), the point sound source control element 202 controls the sound output aspect of the sound output device 222 so that the position of the virtual point sound source is displaced along a second specified position path (FIG. 5/STEP 224). If the determination result is negative (FIG. 5/STEP 223: NO), the series of processing ends.

Figure 10:
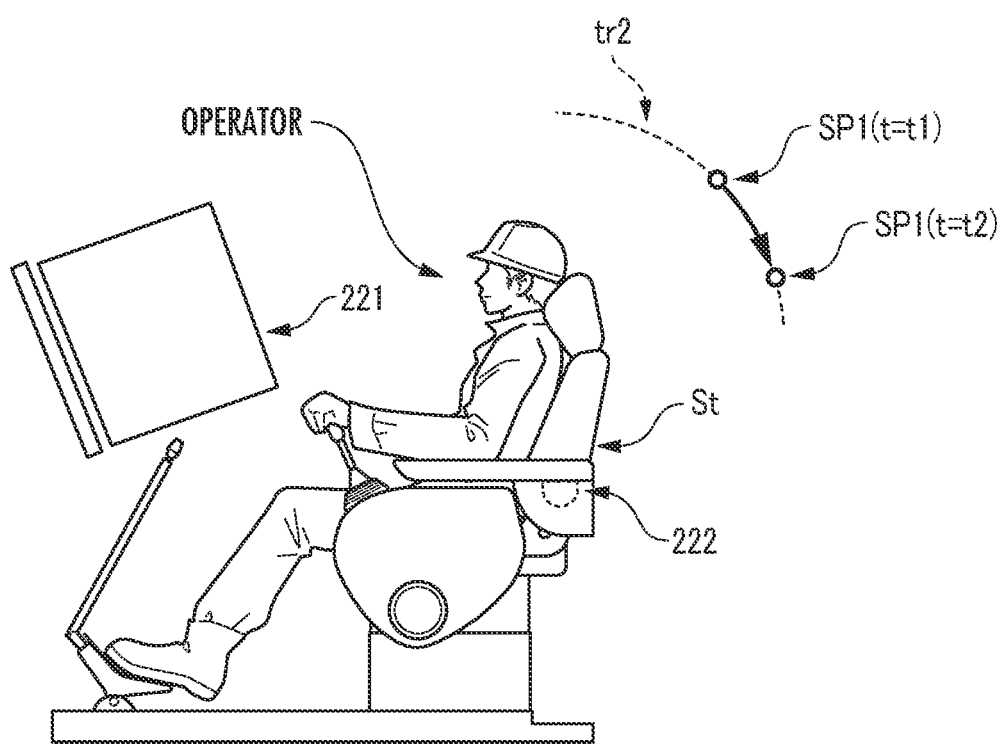
FIG. 10 is an explanatory diagram relating to a position control aspect of a virtual point sound source according to a second motion of the working machine.

Thus, as shown in FIG. 10, for example, the virtual point sound source SP1 is displaced along the second specified position path tr2 extending on the rear and upper sides of the operators remote control area (seat St). The second specified position path tr2 may extend along a plane (sagittal plane) perpendicular to the floor surface of the cab 424 or an inclined plane, and may extend along a curved surface such as a spherical surface, an ellipsoidal surface, or a wave surface. The plane or curved surface may be adjusted to fit within a range of normal operator head positions.

For example, when the displacement speed (relative motion speed) of the bucket 445 with respect to the upper revolving body 420 is zero, the position of the reference point of the virtual point sound source SP1 is adjusted so that it is positioned on the rear side of or directly behind the remote control area. The displacement direction of the virtual point sound source SP1 is controlled in the same direction as the movement direction of the bucket 445 with respect to the upper revolving body 420, and the displacement speed of the virtual point sound source SP1 is controlled to be proportional to the displacement speed of the bucket 445. This allows if operation aspect of the operation mechanism 211 is an operation aspect for lowering the bucket 445 with respect to the upper revolving body 420 by a lowering amount Δ at a displacement speed v(t) from time t=t1 to time t=t2, the virtual point sound source SP1 is displaced along the second specified position path tr2 by an amount γΔ proportional to the lowering amount Δ at a displacement speed γv(t) from time t=t1 to time t=t2.

(Effect)

The remote control device 200 that constitutes the remote operation assistance device having this configuration makes it possible to determine whether there is represented the relative motion of the first component (lower traveling body 410, upper revolving body 420) and the second component (upper revolving body 420, bucket 445 (working unit)), each constituting the working machine 40, based on the result of detecting the operation aspect of the remote operation device 20 (see FIG. 5/STEP 221 and STEP 223).

Then, if the determination result is positive, control is performed on the individual sound output aspects of the plurality of sound output devices 2220, 2221 and 2222, each arranged at different locations in the remote operation space for the operator who operates the remote operation device 20. This displaces the virtual point sound source SP1 along the specified position paths (time series of positions) tr1 and tr2, which are determined according to the relative motion aspect of the second component with respect to the first component (FIG. 5/STEP 221: YES→STEP 222, STET 223: YES→STEP 224, see FIGS. 8 to 10).

This allows the result of the operator, in the remote operation space, perceiving the motion aspect of the working machine 40, specifically the relative motion aspect of the first component and the second component, to approximate to a result of the operator perceiving the relative motion aspect of the first component and the second component when the operator gets on the working machine 40 (or in its cab 424).

In displacing the virtual point sound source SP1, the position of the virtual point sound source SP1 is controlled to a position of the predetermined reference point when the relative motion speed of the second component with respect to the first component is zero. Since the position of the virtual point sound source SP1 does not vary when the relative motion speed of the second component with respect to the first component is zero, the operator can uniformly perceive the motional feeling of the working machine 40. The reference point is positioned on the rear side of the operator in the remote operation space, so that the virtual point sound source SP1 is displaced from the reference point on the rear side of the operator. This allows the operator to perceive the motional feeling of the working machine 40 without losing his/her attention to the front.

Other Embodiments of the Present Invention

In the above embodiment, the remote operation assistance device is constituted of the remote control device 200, but another embodiment may be such that: the remote operation assistance device is constituted of the remote operation assistance server 10; and the first assistance processing element 121 and/or the second assistance processing element 122 function as the state detection element 201 and/or the point sound source control element 202.

The point sound source control element 202 may change at least one of a frequency distribution and a volume of a sound of the virtual point sound source SP1 when displacing the virtual point sound source SP1.

According to the remote operation assistance device with this configuration, the virtual point sound source SP1 is displaced along the specified position path determined according to the relative motion aspect of the second component with respect to the first component of the working machine 40, and also the frequency distribution and/or the volume of the sound of the virtual point sound source changes. This allows the operator in the remote operation space to more clearly pay attention to the virtual point sound source and more clearly perceive the position and/or displacement aspect of the virtual point sound source. Then, this allows the result of the operator perceiving the relative motion aspect of the first component and the second component to approximate to the result of the operator perceiving the relative motion aspect of the first component and the second component when the operator gets on the working machine 40.

As a displacement speed of the virtual point sound source SP1 is higher, the point sound source control element 202 may control a frequency distribution of a sound of the virtual point sound source SP1 to a higher frequency side, and additionally or alternatively may control a volume to be louder.

According to the remote operation assistance device with this configuration, the virtual point sound source SP1 is displaced along the specified position paths tr1 and tr2 determined according to the relative motion aspect of the second component with respect to the first component of the working machine 40. In addition, the frequency distribution of the sound of the virtual point sound source SP1 is adjusted so as to shift to the higher frequency side or the lower frequency side and/or volume thereof is adjusted, according to the displacement speed. This allows the operator in the remote operation space to more clearly pay attention to the virtual point sound source, and to more clearly perceive particularly the displacement aspect of the virtual point sound source based on the difference in frequency or the like. Then, this allows the result of the operator perceiving the relative motion aspect of the first component and the second component to approximate to the result of the operator perceiving the relative motion aspect of the first component and the second component when the operator gets on the working machine 40.

In the remote operation assistance device of the present invention, it is preferable that the point sound source control element changes at least one of a frequency distribution and a volume of a sound of the virtual point sound source when displacing the virtual point sound source.

According to the remote operation assistance device with this configuration, the virtual point sound source is displaced along a specified position path determined according to the relative motion aspect of the second component with respect to the first component. In addition, the frequency distribution and/or volume of the sound of the virtual point sound source changes. This allows the operator in the remote operation space to more clearly pay attention to the virtual point sound source and more clearly perceive the position and/or displacement aspect of the virtual point sound source. Then, this allows the result of the operator perceiving the relative motion aspect of the first component and the second component to approximate to the result of the operator perceiving the relative motion aspect of the first component and the second component when the operator gets on the working machine.

In the remote operation assistance device of the present invention, it is preferable that as a displacement speed of the virtual point sound source is higher, the point sound source control element controls a frequency distribution of a sound of the virtual point sound source to a higher frequency side, and additionally or alternatively control a volume to be louder.

According to the remote operation assistance device with this configuration, the virtual point sound source is displaced along a specified position path determined according to the relative motion aspect of the second component with respect to the first component. In addition, the frequency distribution of the sound of the virtual point sound source is adjusted so as to shift to the higher frequency side or the lower frequency side and/or volume thereof is adjusted, according to the displacement speed. This allows the operator in the remote operation space to more clearly pay attention to the virtual point sound source, and to more clearly perceive particularly the displacement aspect of the virtual point sound source based on the difference in frequency or the like. Then, this allows the result of the operator perceiving the relative motion aspect of the first component and the second component to approximate to the result of the operator perceiving the relative motion aspect of the first component and the second component when the operator gets on the working machine.

In the remote operation assistance device of the present invention, it is preferable that the point sound source control element displaces a virtual point sound source along a specified position path when a motion state of the working machine or an operation aspect of the remote operation device represents a revolving motion of an upper revolving body, as the second component, with respect to a lower traveling body, as the first component, the specified position path being determined according to a revolving speed of the upper revolving body with respect to the lower traveling body, the specified position path extending in a curved shape so as to partially surround an operator in the remote operation space, the motion state of the working machine or the operation aspect of the remote operation device being detected by the state detection element.

The remote operation assistance device with this configuration allows the result of the operator, in the remote operation space, perceiving the revolving motion of the upper revolving body (second component) with respect to the lower traveling body (first component) to approximate to the result of the operator perceiving the revolving motion of the upper revolving body with respect to the lower traveling body when the operator gets on the working machine.

In the remote operation assistance device of the present invention, it is preferable that the point sound source control element displaces a virtual point sound source along a specified position path when a motion state of the working machine or an operation aspect of the remote operation device represents a relative motion of a working unit of a working mechanism, as the second component, with respect to an upper revolving body, as the first component, the specified position path being determined according to a relative motion aspect of the working unit with respect to the upper revolving body, the motion state of the working machine or the operation aspect of the remote operation device being detected by the state detection element.

The remote operation assistance device with this configuration allows the result of the operator, in the remote operation space, perceiving the relative motion aspect of the working unit (second component) with respect to the upper revolving body (first component) to approximate to the result of the operator perceiving the relative motion aspect of the working unit with respect to the upper revolving body when the operator gets on the working machine.

In the remote operation assistance device of the present invention, it is preferable that in a case in which the point sound source control element displaces the virtual point sound source, the point sound source control element positions the virtual point sound source at a predetermined reference point when a relative motion speed of the second component with respect to the first component is zero.

According to the remote operation assistance device with this configuration, the virtual point sound source is adjusted so that: it is positioned at the reference point when the relative motion speed of the second component with respect to the first component is 0 (zero); and it is displaced from the base point at a speed corresponding to the relative motion speed when the relative motion speed becomes greater than zero. The position of the virtual point sound source returns to the reference point when the relative motion speed of the second component with respect to the first component is zero, and the position of the virtual point sound source does not vary. Therefore, the operator can uniformly perceive the motional feeling of the working machine.

In the remote operation assistance device of the present invention, it is preferable that the point sound source control element positions the reference point on a rear side of an operator in the remote operation space.

According to the remote operation assistance device with this configuration, the virtual point sound source is displaced from the reference point on the rear side of the operator. This allows the operator to perceive the motional feeling of the working machine without losing his/her attention to the front.

In the remote operation assistance device of the present invention, it is preferable that the point sound source control element displaces the virtual point sound source along the specified position path biased to a rear side of an operator in the remote operation space.

According to the remote operation assistance device with this configuration, the virtual point sound source can be displaced along the specified position path, which is more biased to the rear side of the remote operation space than on the front side thereof. This allows the operator to perceive the motional feeling of the working machine without losing his/her attention to the front.

REFERENCE SIGNS LIST 10 remote operation assistance server, 20 remote operation device, 40 working machine, 102 database, 121 first assistance processing element, 122 second assistance processing element, 200 remote control device (remote operation assistance device), 201 state detection element, 202 point sound source control element, 210 remote input interface, 211 remote operation mechanism, 220 remote output interface, 221 image output device, 222 sound output device, 400 actual machine control device, 41 actual machine input interface, 42 actual machine output interface, 424 cab (operation room), 440 working mechanism (actuating mechanism), 445 bucket (working unit), tr1 first specified position path, tr2 second specified position path, SP1 virtual point sound source.

The invention claimed is:

1. A remote operation assistance device, comprising:
a state detection element configured to detect a motion state of a working machine or an operation aspect of a remote operation device, the remote operation device being configured to remotely control the working machine; and
a point sound source control element configured to control individual sound output aspects of a plurality of sound output devices to displace a virtual point sound source along a specified position path when the motion state of the working machine or the operation aspect of the remote operation device represents a relative motion of a second component with respect to a first component, the plurality of sound output devices each being arranged at different locations in a remote operation space for an operator who operates the remote operation device, the first component and the second component constituting the working machine, the specified position path being determined according to the relative motion aspect of the second component with respect to the first component, the motion state of the working machine or the operation aspect of the remote operation device being detected by the state detection element.

2. The remote operation assistance device according to claim 1, wherein
the point sound source control element changes at least one of a frequency distribution and a volume of a sound of the virtual point sound source when displacing the virtual point sound source.

3. The remote operation assistance device according to claim 2, wherein
as a displacement speed of the virtual point sound source increases, the point sound source control element controls a frequency distribution of the sound of the virtual point sound source to a higher frequency side, and additionally or alternatively controls a volume to be louder.

4. The remote operation assistance device according to claim 1, wherein
the point sound source control element displaces a virtual point sound source along a specified position path when the motion state of the working machine or the operation aspect of the remote operation device represents a revolving motion of an upper revolving body, as the second component, with respect to a lower traveling body, as the first component, the specified position path being determined according to a revolving speed of the upper revolving body with respect to the lower traveling body, the specified position path extending in a curved shape so as to partially surround the operator in the remote operation space, the motion state of the working machine or the operation aspect of the remote operation device being detected by the state detection element.

5. The remote operation assistance device according to claim 1, wherein
the point sound source control element displaces a virtual point sound source along a specified position path when the motion state of the working machine or the operation aspect of the remote operation device represents a relative motion of a working unit of a working mechanism, as the second component, with respect to an upper revolving body, as the first component, the specified position path being determined according to a relative motion aspect of the working unit with respect to the upper revolving body, the motion state of the working machine or the operation aspect of the remote operation device being detected by the state detection element.

6. The remote operation assistance device according to claim 1, wherein
in a case in which the point sound source control element displaces the virtual point sound source, the point sound source control element positions the virtual point sound source at a predetermined reference point when a relative motion speed of the second component with respect to the first component is zero.

7. The remote operation assistance device according to claim 6, wherein
the point sound source control element positions the reference point on a rear side of the operator in the remote operation space.

8. The remote operation assistance device according to claim 1, wherein
the point sound source control element displaces the virtual point sound source along the specified position path biased to a rear side of the operator in the remote operation space.

9. A remote operation assistance method, comprising:
a state detection step of detecting a motion state of a working machine or an operation aspect of a remote operation device, the remote operation device being configured to remotely control the working machine; and
a point sound source control step of controlling individual sound output aspects of a plurality of sound output devices to displace a virtual point sound source along a specified position path when the motion state of the working machine or the operation aspect of the remote operation device represents a relative motion of a second component with respect to a first component, the plurality of sound output devices each being arranged at different locations in a remote operation space for an operator who operates the remote operation device, the first component and the second component constituting the working machine, the specified position path being determined according to a relative motion aspect of the second component with respect to the first component, the motion state of the working machine or the operation aspect of the remote operation device being detected in the state detection step.

* * * * *